(12) United States Patent
Matsumoto

(10) Patent No.: US 7,738,701 B2
(45) Date of Patent: Jun. 15, 2010

(54) MEDICAL IMAGE PROCESSING APPARATUS, ROI EXTRACTING METHOD AND PROGRAM

(75) Inventor: Kazuhiko Matsumoto, Tokyo (JP)

(73) Assignee: Ziosoft, Incorporated, Tokyo (JP)

(*) Notice: Subject to any disclaimer, the term of this patent is extended or adjusted under 35 U.S.C. 154(b) by 665 days.

(21) Appl. No.: 10/858,625

(22) Filed: Jun. 2, 2004

(65) Prior Publication Data
US 2005/0143639 A1    Jun. 30, 2005

(30) Foreign Application Priority Data
Dec. 25, 2003    (JP) .............................. 2003-428935

(51) Int. Cl.
*G06K 9/34*    (2006.01)
(52) U.S. Cl. ...................................... 382/173; 382/128
(58) Field of Classification Search ................. 382/131, 382/128, 132, 270, 173; 378/4, 19, 21, 22, 378/23, 26; 600/425, 407; 250/363.04; 348/77, 348/162, 163; 345/420, 423, 428
See application file for complete search history.

(56) References Cited

U.S. PATENT DOCUMENTS

| | | | |
|---|---|---|---|
| 5,831,612 A | 11/1998 | Stoval, III et al. | |
| 6,563,941 B1 | 5/2003 | Aharon et al. | |
| 6,678,399 B2 | 1/2004 | Doi et al. | |
| 6,754,376 B1 * | 6/2004 | Turek et al. | ................. 382/131 |

FOREIGN PATENT DOCUMENTS

| | | |
|---|---|---|
| EP | 1225541 A2 * | 7/2002 |
| JP | 04-292150 | 10/1992 |
| JP | 05-120451 | 5/1993 |
| JP | 06-070923 | 3/1994 |
| JP | 08-106546 | 4/1996 |
| JP | 08-161520 | 6/1996 |
| JP | 09-327455 | 12/1997 |
| JP | 2001-118086 | 4/2001 |
| JP | 2003-153894 | 5/2003 |

OTHER PUBLICATIONS

Interactive Deformation and Visualization of Level Set Surfaces Using Graphics Hardware—Scientific Computing and Imaging Institute, University of Utah (Aaron E. Lefohn, et al).

* cited by examiner

Primary Examiner—Brian Casler
Assistant Examiner—Elmer Chao
(74) Attorney, Agent, or Firm—Howard & Howard Attorneys PLLC

(57) ABSTRACT

An image processing apparatus defines at least two display regions on a designated and displays a target three-dimensional medical image in one of the display regions based on three-dimensional volume data. When specifying the coordinates of an input point designated in the display region, the image processing apparatus records at least the specified coordinates as history information. The image processing apparatus further specifies a continuous region containing the specified coordinates. When the continuous region is specified, the image processing apparatus displays an image showing a region of interest in one of the display regions by displaying at least one image showing the specified continuous region in a display region different from the display region where the target image is displayed.

11 Claims, 14 Drawing Sheets

| OPERATION NUMBER | INPUT POINT | | OPERATION | ... |
| --- | --- | --- | --- | --- |
| | W1 | W2 | | |
| 001 | X1, Y1, Z1 | --- | SUBTRACT | ... |
| 002 | --- | X2, Y2, Z2 | ADD | ... |
| 003 | X3, Y3, Z3 | --- | SUBTRACT | ... |
| 004 | --- | X4, Y4, Z4 | ADD | ... |
| ⋮ | ⋮ | ⋮ | ⋮ | ⋮ |

OPERATION HISTORY DB 361

FIG.4

OPERATION : "SUBTRACT"

MEDICAL IMAGE PROCESSING APPARATUS, ROI EXTRACTING METHOD AND PROGRAM

RELATED APPLICATIONS

This application claims priority to Japanese Application No. 2003-428935 filed Dec. 25, 2003.

BACKGROUND OF THE INVENTION

1. Field of the Invention

The present invention relates to a medical image processing apparatus and a medical image processing method for generating a three-dimensional medical image used in image diagnosis, etc.

2. Description of the Related Art

Conventionally, there has been conducted image diagnosis for diagnosing diseases, etc. by acquiring a tomographic (slice) image of an organ, etc. of a human body using a modality (image acquiring apparatus) such as a CT scanner, an MRI apparatus, etc.

Further, a method of conducting diagnosis by generating a three-dimensional image of a predetermined organ, etc. based on an acquired tomographic image has been established, contributing to a precise and accurate diagnosis.

Such an image diagnosis involves a work of selecting a target portion to be diagnosed (so-called "region-of-interest") from the image of an image-taken region, and then extracting the image of the selected region-of-interest (ROI). A typical way of selecting an ROI is to select a continuous region (one closed region with the same contour as the ROI) containing an arbitrary point designated by an operator using a scheme, such as flood fill. Unexamined Japanese Patent Application KOKAI Publication No. H6(1994)-70923 discloses another ROI selecting method by which an operator designates a region to be selected in such a way as to surround an ROI.

Apparently, the work of selecting an ROI highly depends on the operation by an operator. This is likely to result in selection of an unnecessary region or exclusion of a necessary region.

In case where the heart and vessels around the heart are an ROI, an operator first inputs an arbitrary point by, for example, clicking a position on the screen which corresponds to the heart and the vessels according to the continuous-region selecting method. Then, a continuous region containing the input arbitrary point is selected and extracted as an image showing the heart and vessels. In case of extracting a continuous region containing an input arbitrary point, when a part of a vessel is in contact with a portion other than an ROI, for example, such a part is also selected and extracted as a continuous region.

In the second method by which an operator designates a selection range, the operator designates the selection range in such a way as to encompass a portion which is an ROI. It is however very difficult to accurately select a delicate part like vessels around the heart. Either method brings about a shortcoming that a necessary part cannot be selected adequately.

When an ROI cannot be selected (designated) accurately, normally, a so-called "Undo" operation or so is taken to return to one previous operational state and make selection again. Therefore, the prior arts repeatedly perform a designating operation and an Undo operation to select and extract a target ROI.

SUMMARY OF THE INVENTION

Accordingly, it is an object of the invention to provide an efficient working environment when an ROI is extracted from a medical image.

To achieve the object, according to the first aspect of the invention, there is provided a medical image processing apparatus which processes a medical image generated from three-dimensional volume data showing gradation at a plurality of coordinates indicating an inside of a living body and comprises:

a display control unit which has a plurality of display regions and displays the medical image in the display regions;

a reception unit which accepts designation of an arbitrary point on the medical image;

a coordinate specifying unit which specifies coordinates indicating a position in the three-dimensional volume data of the point designated by the acceptance; and a region specifying unit which specifies a closed region inside the living body which is expressed by the three-dimensional volume data and which contains the designated point; wherein the display control unit creates at least one image of the closed region and a region obtained by subtracting the closed region from a region inside the living body expressed by the three-dimensional volume data and displays those images in different display regions, respectively.

It is desirable that in the medical image processing apparatus, wherein the reception unit accepts designation of an arbitrary point on an image which is displayed in one display region, and the display control unit creates at least one image of a region obtained by subtracting a closed region containing a designated point from a region whose image is displayed in the one display region and displays the created image in the one display region and displays an image of the closed region in another display region.

It is preferable that in the medical image processing apparatus, wherein the different display regions overlap one another and constitute substantially a single display region, and the display control unit displays the image of the closed region and the image obtained by subtracting the closed region from the region inside the living body expressed by the three-dimensional volume data in the display region in such a way as to overlie each other.

It is desirable that in the medical image processing apparatus, further comprising a recording unit which records information about a position of a designated point in the image and information indicating the coordinates indicating the position in the three-dimensional volume data of the point designated specified by the coordinate specifying unit in association with each other, and wherein the region specifying unit calculates with the information recorded by the recording unit and the three-dimensional volume data, and specifies the contour of the closed region containing the designated point.

Alternatively, it is preferable that the reception unit accepts designation of whether to subtract the closed region containing the designated point from the region inside the living body expressed by the three-dimensional volume data on the image displayed in the display region, and The recording unit records information about whether or not to subtract the designated point, and the display control unit creates at least one image of the region obtained by subtracting the closed region containing the designated point from the region inside the living body expressed by the three-dimensional volume data based on the information recorded by the recording unit and the contour of the closed region and display it in one display region and create at least one image of the closed region and display it in another display region.

To achieve the object, a region-of-interest extracting method according to the second aspect of the invention, which extracts an image showing a region of interest by processing a predetermined medical image using a computer, comprises:

a target-image display step which displays a target medical image to be processed;

a reception step which accepts designation of an input point on the target image;

a coordinate specifying step which specifies coordinates indicating a position in the three-dimensional volume data of the designated input point;

a region specifying step which specifies a closed region inside the living body which is expressed by the three-dimensional volume data and which contains the designated point based on the coordinates of the input point specified at the coordinate specifying step and the three-dimensional volume data; and a display step which creates and displays at least one image of the specified closed region and at least one image obtained by subtracting the closed region from a region expressed by the target image in a simultaneously viewable manner, wherein the coordinate specifying step further specifies the position of the input point on the image displayed at the display step, and the display step displays one of plural images to be displayed, as an image showing a region of interest.

It is preferable that the display step displays at least one image of the closed region and at least one image obtained by subtracting the closed region from the region inside the living body expressed by the target image in different display regions, respectively.

Alternatively, it is preferable that the display step displays at least one image of the closed region and at least one image obtained by subtracting the closed region from the region inside the living body expressed by the target image in a same display region in different display modes.

It is preferable that the display step displays another medical image different from the target image, together with the image of the region of interest.

It is desirable that the coordinate specifying step further includes an input-point information recording step which records at least information indicating a position of a specified input point, and the region specifying step specifies the closed region based on the input-point information recorded at the input-point information recording step.

To achieve the object, a program according to the third aspect of the invention allows a computer to function as a medical image processing apparatus comprising:

a display-region defining unit which defines at least two display regions on a predetermined display device;

a target-image display unit which displays a target medical image in one of the display regions based on three-dimensional volume data indicating an inside of a living body;

a coordinate specifying unit which specifies coordinates of an input point designated in the display region;

a recording unit which records at least the coordinates specified by the coordinate specifying unit;

a region specifying unit which specifies a closed region containing the designated point based on information recorded by the recording unit; and a display control unit which creates and displays at least one image showing the closed region specified by the region specifying unit in one of the display regions.

To achieve the object, a program according to the fourth aspect of the invention extracts a region-of-interest image by processing a medical image by allowing a computer to execute:

a target-image display step which displays a target medical image to be processed in a predetermined display region on a display device;

an input-point specifying step which specifies an input point designated on the target image;

a recording step which records information indicating the specified input point;

a region specifying step which specifies a closed region containing the designated point based on the recorded information of input point; and a region-of-interest display step which displays one of the images showing the specified closed region and at least one image obtained by subtracting the image of the closed region from the target image as an image showing a region of interest by displaying those two images in a simultaneously viewable manner.

The invention can reduce the work load and the work time needed at the time of extracting an ROI from a medical image and can efficiently select and extract an ROI. Further, the invention provides a more effective image diagnosis scheme.

BRIEF DESCRIPTION OF THE DRAWINGS

These objects and other objects and advantages of the present invention will become more apparent upon reading of the following detailed description and the accompanying drawings in which:

FIG. 4 is a diagram showing an example of information which is recorded in an "operation history DB" created in a storage unit in the image processing apparatus shown in FIG. 3;

DETAILED DESCRIPTION OF THE PREFERRED EMBODIMENT

An embodiment of the present invention will now be explained with reference to the drawings. In the embodiment to be described below, explanation will be made by taking a case where the present invention is applied to three-dimensional image diagnosis in a predetermined medical facility (hereinafter referred to as "medical facility H") as an example.

Figure 1:
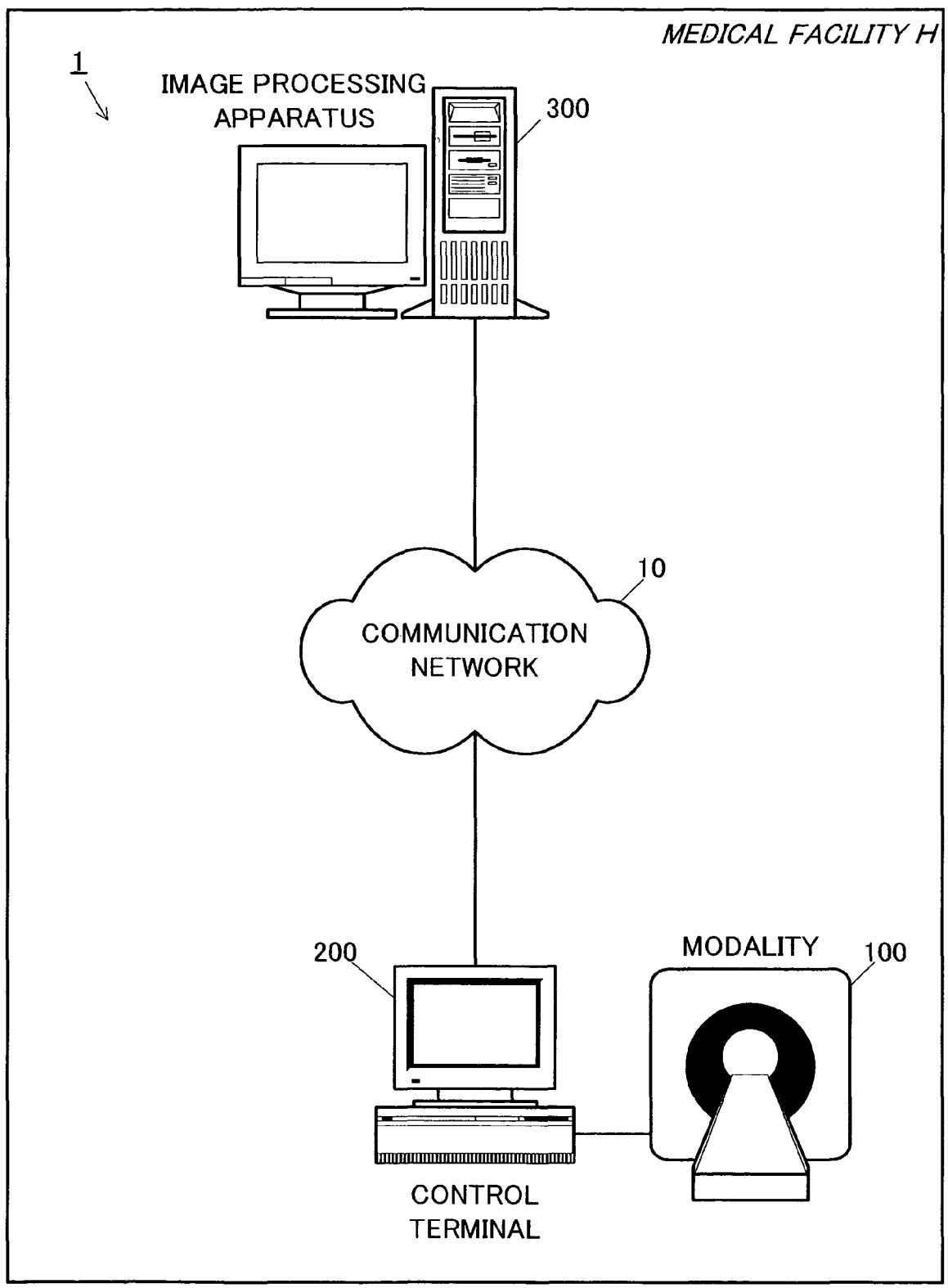
FIG. 1 is a diagram exemplarily showing a structure of an "image diagnosis system" according to an embodiment of the present invention.

FIG. 1 is a diagram showing a structure of an image diagnosis system according to an embodiment of the present invention. As shown in FIG. 1, the image diagnosis system 1 according to the present embodiment comprises a communication network 10, a modality 100, a control terminal 200, and an image processing apparatus 300.

The communication network 10 is a communication network that mutually connects the control terminal 200 and the image processing apparatus 300 in the medical facility H, and intermediates information transmission between them. The communication network 10 intermediates information transmission which is based on a predetermined communication protocol, such as DICOM (Digital Imaging and Communications in Medicine).

Next, the modality 100 will be explained. The modality 100 is an image acquiring apparatus for acquiring an image of the inside of a human body, and may be, for example, a CT scanner (Computerized Tomography apparatus), a helical CT, an MRI (Magnetic Resonance Imaging apparatus), a PET (Positron Emission Tomography apparatus), etc. In the present embodiment, a CT scanner for acquiring a tomographic image of the inside of a human body using X-rays is employed as the modality 100.

According to the present embodiment, the modality 100 (CT scanner) is controlled by the control terminal 200 to be described later, and acquires a tomographic (slice) image of the inside (inside of a biological body) of a patient or a medical examinee (hereinafter referred to as "medical examinee, etc."). Since in the present embodiment, a CT scanner is employed as the modality 100, information representing a tomographic image includes CT values which are X-ray absorption factors. The modality 100 and the control terminal 200 are connected to each other based on a predetermined medical image communication standard such as DICOM (Digital Imaging and Communications in Medicine).

Next, the control terminal 200 will be explained. The control terminal 200 is constituted by a predetermined information processing apparatus such as a workstation. The control terminal 200 controls the operation of the modality 100 connected thereto, and receives acquired image data (original data) obtained by image acquiring by the modality 100. The structure of the control terminal 200 will be explained with reference to FIG. 2.

Figure 2:
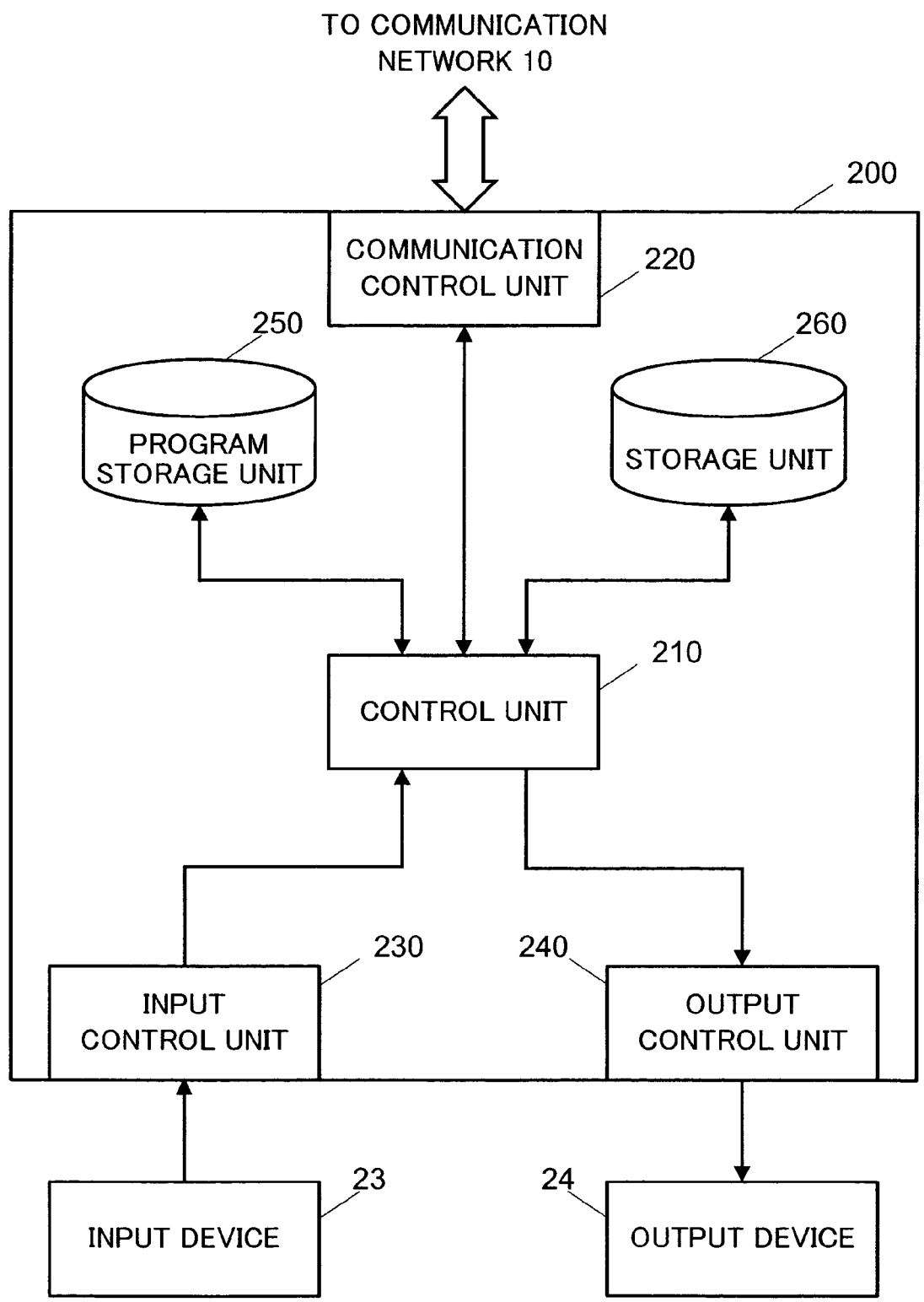
FIG. 2 is a block diagram showing a structure of a "control terminal" shown in FIG. 1.

FIG. 2 is a block diagram showing the structure of the control terminal 200. As shown in FIG. 2, the control terminal 200 comprises a control unit 210, a communication control unit 220, an input control unit 230, an output control unit 240, a program storage unit 250, and a storage unit 260.

The control unit 210 is constituted by, for example, a CPU (Central Processing Unit) and a predetermined storage device (RAM (Random Access Memory) or the like) that serves as a work area. The control unit 210 controls each unit of the control terminal 200, and executes each process to be described below based on a predetermined operational program stored in the program storage unit 250.

The communication control unit 220 is constituted by, for example, a predetermined communication device such as a predetermined NIC (Network Interface Card). The communication control unit 220 connects the control terminal 200 to the modality 100 and the communication network 10, for performing communications with the modality 100 and the image processing apparatus 300.

The input control unit 230 is connected to a predetermined input device 23 such as, for example, a keyboard and a pointing device, etc. The input control unit 230 receives instructions, etc. to the control unit 210 which is input from the input device 23, and transmits the received instructions to the control unit 210.

The output control unit 240 is connected to a predetermined output device 24 such as, for example, a display device, a printer, etc. The output control unit 240 outputs a process result of the control unit 210 to the output device 24 if necessity arises.

The program storage unit 250 is constituted by a predetermined storage device such as a hard disk device, a ROM (Read Only Memory), etc. The program storage unit 250 stores various operational programs executed by the control unit 210. The program storage unit 250 stores an arbitrary OS (Operating System) that controls the basic operation of the control terminal 200, and operational programs shown in the following (1) and (2) for realizing each process to be described below in cooperation with the OS. The processes to be described below which are performed by the control terminal 200 are realized by the control unit 210 executing these operational programs.

"Modality control program": a program for controlling the modality 100.

"Communication program": a program for controlling the communication control unit 220 and performing communications with the modality 100 and communications via the communication network 10.

The storage unit 260 is constituted by a storage device such as a RAM (Random Access Memory), a hard disk device, etc. The storage unit 260 stores acquired image data obtained from the modality 100, etc.

"Acquired image data" (original data) obtained from the modality 100 indicates "three-dimensional volume data" of an image-taken region. The three-dimensional volume data is comprised of coordinates information in an image-taken region and the value of a voxel at each coordinate position. Because a "CT scanner" is used as the modality 100 in the embodiment, a "CT value" is used as a voxel value. Here, the "CT value" indicates an "X-ray absorption coefficient". When an image is generated by using the CT value as a pixel value, a difference in CT value appears as a difference in brightness on an image. Accordingly, a three-dimensional image which shows the inside of a living body (human body).

The image processing apparatus 300 will be explained next. The image processing apparatus 300 is constituted by a predetermined information processing apparatus such as a workstation. The image processing apparatus 300 generates a three-dimensional diagnosis image (medical image) by using acquired image data (three-dimensional volume data) obtained from the control terminal 200. The structure of the image processing apparatus 300 will be explained with reference to FIG. 3.

Figure 3:
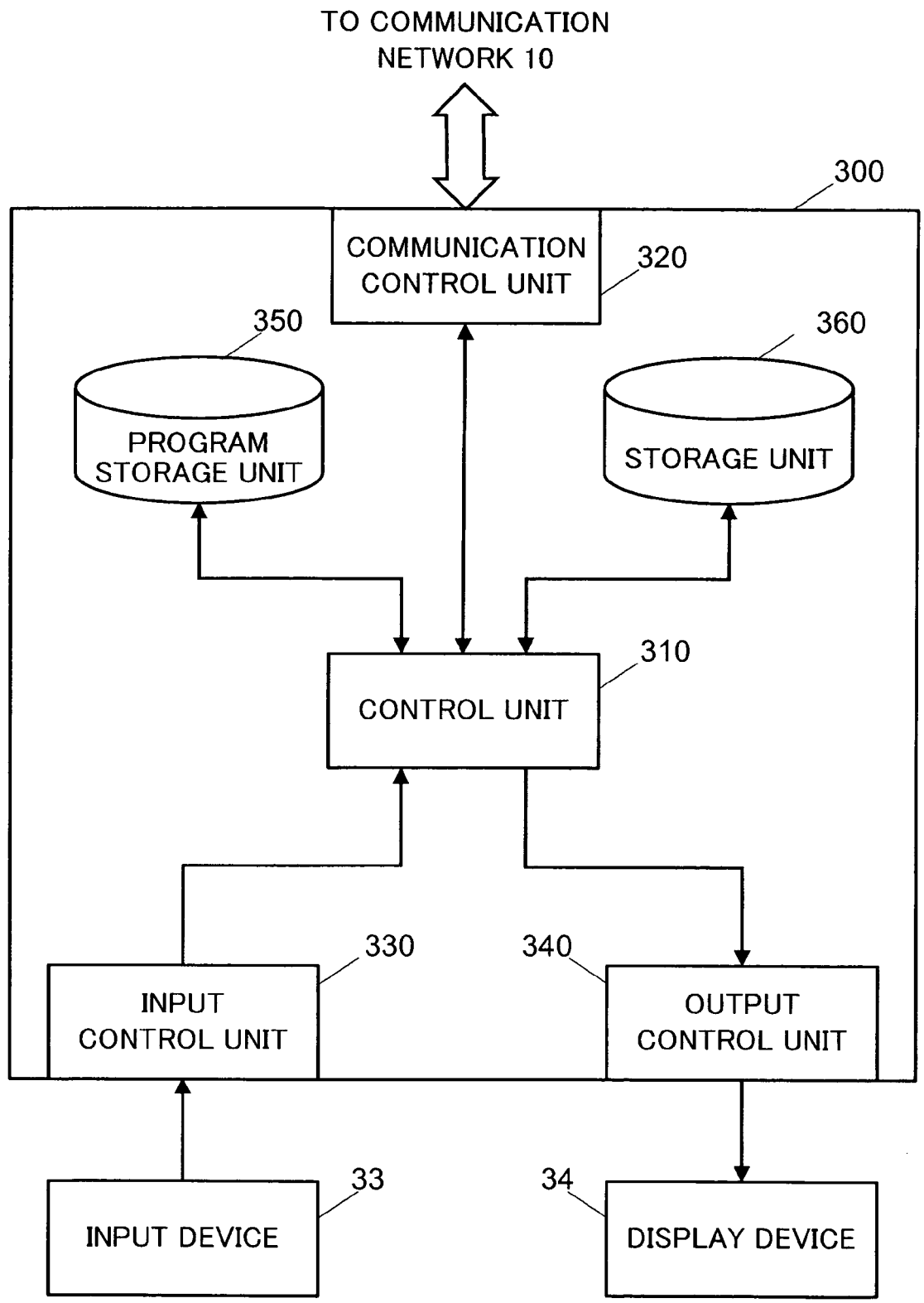
FIG. 3 is a block diagram showing the structure of an "image processing apparatus" shown in FIG. 1.

FIG. 3 is a block diagram showing the structure of the image processing apparatus 300. As shown in FIG. 3, the image processing apparatus 300 comprises a control unit 310, a communication control unit 320, an input control unit 330, an output control unit 340, a program storage unit 350, and an image storage unit 360.

The control unit 310 is constituted by, for example, a CPU (Central Processing Unit) and a predetermined storage device (RAM (Random Access Memory), etc.) used as a work area. The control unit 310 controls each unit of the image processing apparatus 300, and performs each process to be described below based on predetermined operational programs stored in the program storage unit 350.

The communication control unit 320 is constituted by a predetermined communication device such as a predetermined NIC (Network Interface Card). The communication control unit 320 connects the image processing apparatus 300 to the communication network 10, for performing communications with the control terminal 200, etc.

The input control unit 330 is connected to a predetermined input device 33 such as, for example, a keyboard, a pointing device, etc. The input control unit 330 receives instructions to the control unit 310, information to be stored in each database, etc., which are input from the input device 33, and transmits them to the control unit 310.

The output control unit 340 is connected to a predetermined output device 34, such as a display device or printer. The output control unit 340 outputs the process result or so of the control unit 310 to the output device 34 as needed. In the embodiment, a display device is used as the output device 34 and is referred to as "display device 34" hereinafter.

The program storage unit 350 is constituted by a predetermined storage device such as a hard disk device, a ROM (Read Only Memory), etc. The program storage unit 350 stores various operational programs executed by the control unit 310. The operational programs stored in the program storage unit 350 include, other than an arbitrary OS (Operating System) that controls the basic operation of the image processing apparatus 300, operational programs shown in the following (1) to (3) for realizing each process to be described below in cooperation with the OS. The processes to be described below which are performed by the image processing apparatus 300 are realized by the control unit 310 executing these operational programs.

"Communication program": a program for controlling the communication control unit 320 and performing communications with the control terminal 200 via the communication network 10.

"DB control program": a program for controlling the storage unit 360.

"Image processing program": a program for applying image processing to acquired image data obtained from the control terminal 200.

"Display control program": a program for controlling the display device 34 and performing the display control of an image processing result.

The storage unit 360 is comprised of a storage device including a rewritable storage medium, such as a semiconductor storage device or a hard disk device. The storage unit 360 stores various data needed in image processing that is executed by the image processing apparatus 300. That is, acquired image data, three-dimensional medical image or an image processing result or so acquired from the control terminal 200 is stored in the storage unit 360. The storage unit 360 constitutes a predetermined DB (DataBase) where data needed in image processing is stored.

A database, such as an operation history DB 361, is constructed in the storage unit 360. The operation history DB 361 stores information indicating the operation history when an ROI is selected by an operator, in a time-sequential order. FIG. 4 shows an example of information which is recorded in the operation history DB 361. As illustrated in the diagram, records with an "operation number" as a main key are created in the operation history DB 361. Each record has at least three items, "input point", "operation" and "display region", set therein. The "operation number" is a serial number given to an operation for extracting an ROI in one medical image in a time-sequential order.

Three-dimensional coordinates of an arbitrary point designated by the operator are recorded in the "input point".

The "operation" is the item which indicates an operation done for a closed region containing the coordinates of the corresponding "input point", and where either "subtract" or "add" is recorded.

The item "input point" is separated into parts respectively corresponding to display regions. It is assumed that there are at least two display regions provided on the display device 34 in the embodiment, the first one being a "first display region W1" while the other one is a "second display region W2". Therefore, the item "input point" is separated into "W1" and "W2" and coordinate information is recorded in a field corresponding to a display region where an operation is done. Information indicating a closed region which is specified by a "region extracting process" to be discussed later or input-point set information which is referred to in a "region segmentation process" to be discussed later may be recorded in each record.

The operation of the image diagnosis system 1 with the above-described structure will be explained below referring to the accompanying drawings. In the embodiment, an ROI is extracted by using the invention at the time of generating a medical image for image diagnosis using acquired image data acquired by the modality 100. It is premised that an operator, such as a doctor or an engineer, inputs an arbitrary point in the designation of an ROI. It is also premised that a three-dimensional image is generated by "volume rendering" using the "ray casting scheme".

Figure 5:
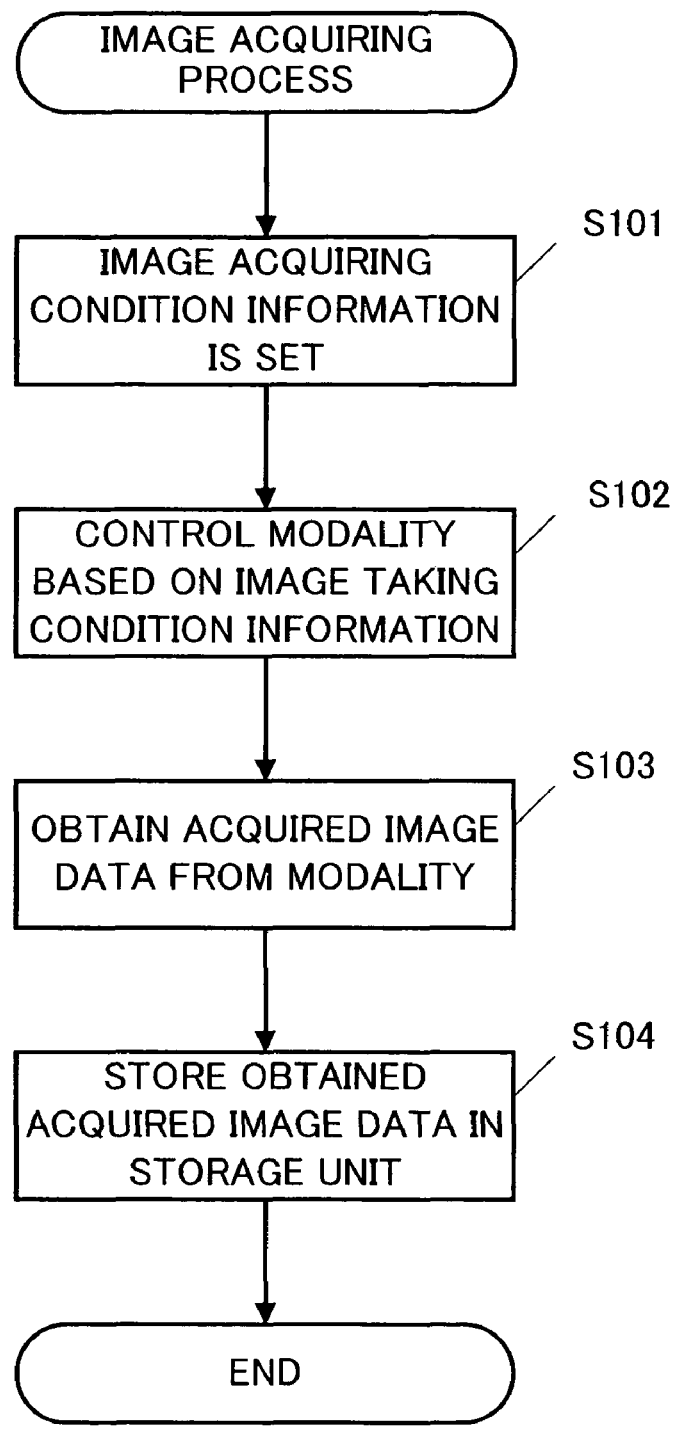
FIG. 5 is a flowchart for explaining an "image acquiring process" according to an embodiment of the present invention.

First, the "image taking process" according to the embodiment will be described referring to a flowchart illustrated in FIG. 5. In the process, the modality 100 and the control terminal 200 cooperate to acquire a tomographic (slice)

image of an organ, etc. of a human body of an examinee or so. The following description will be given mainly on the operation of the control terminal 200.

In performing the image acquiring operation, predetermined image acquiring condition information is set at the control terminal 200 (step S101). In this step, various conditions for image acquiring, such as designation of an image acquiring target area, use or non-use of a contrast medium, etc. are set.

The control terminal 200 controls the modality 100 in accordance with the image acquiring conditions set in step S101 (step S102). That is, the modality 100 performs an image acquiring operation based on the above image acquiring conditions under the control of the control terminal 200. As a result, the modality 100 obtains acquired image data (three-dimensional volume data) of the set image acquiring target area.

When the image acquiring operation of the modality 100 is completed, the control terminal 200 receives the obtained acquired image data from the modality 100 (step S103). Then, the control terminal 200 stores the received acquired image data in the storage unit 260 (step S104), and finishes this process.

Figure 6:
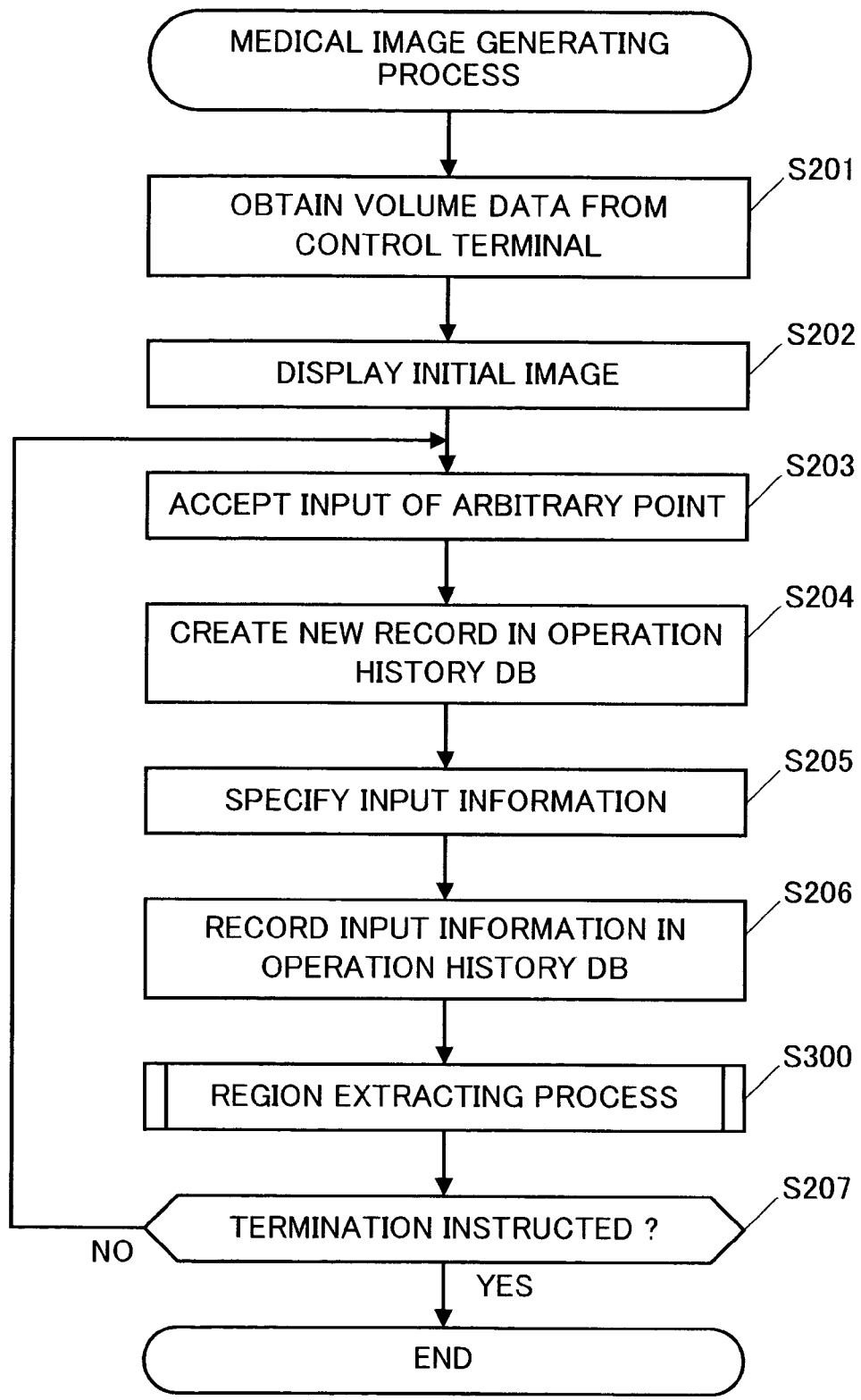
FIG. 6 is a flowchart illustrating a "medical image generating process" according to the embodiment of the invention.

Next, the "medical image generating process" according to the embodiment will be described referring to a flowchart illustrated in FIG. 6. In the "medical image generating process", a given three-dimensional medical image is processed to extract an "ROI" to be diagnosed. The "medical image generating process" is achieved as the control unit 310 of the image processing apparatus 300 runs an "image processing program" or a "display control program". The "medical image generating process" is initiated in response to, for example, a predetermined operation done by an operator.

When the "medical image generating process" starts, the control unit 310 of the image processing apparatus 300 obtains target acquired image data (three-dimensional volume data) from the storage unit 260 of the control terminal 200 over the communication network 10 (step S201). Then, the control unit 310 develops the acquired image data obtained in a predetermined memory area, such as a RAM, in the control unit 310. The control unit 310 generates an "initial image" (target image) which is an extraction target in an ROI using the obtained three-dimensional volume data and displays the image on the display device 34 (step S202).

Figure 7:
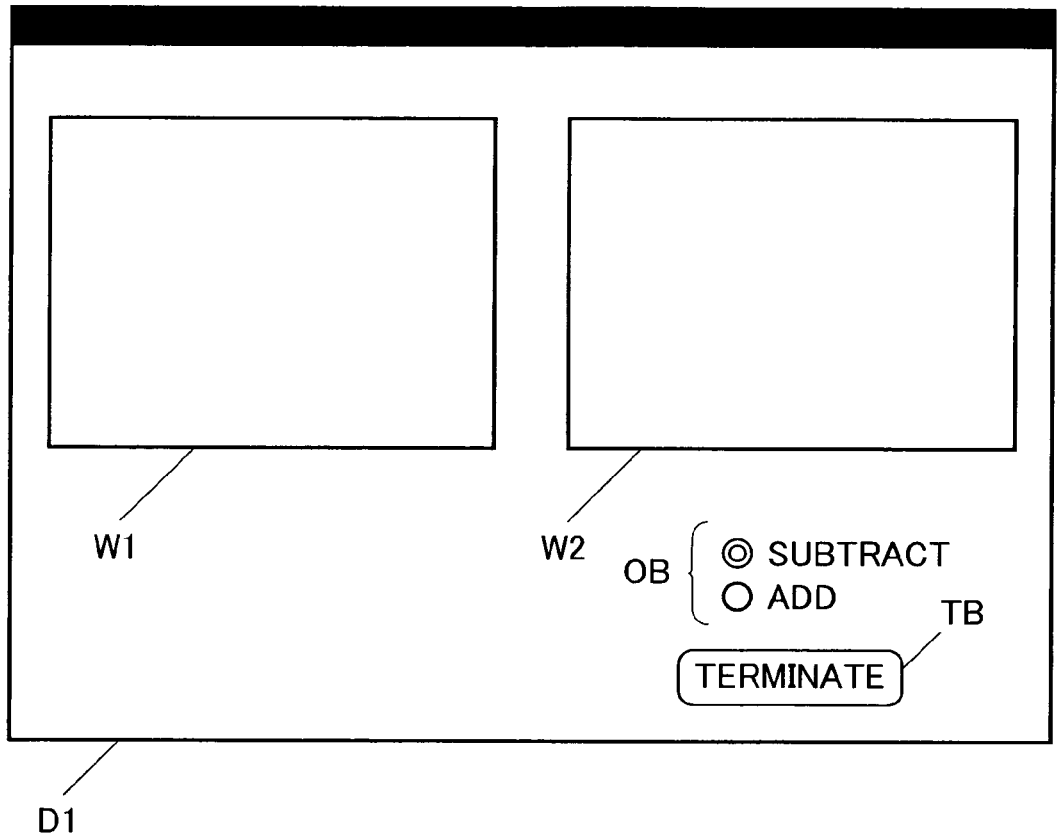
FIG. 7 is a diagram showing a display example of a "display screen" which is displayed by the "medical image generating process" shown in FIG. 6.

A display example of an image on the display device 34 will be discussed using FIGS. 7 and 8. As shown in FIG. 7, the first display region W1 and second display region W2 are defined side by side on a display screen D1 on the display device 34. The control unit 310 of the image processing apparatus 300 controls the output control unit 340 and displays the generated initial image in the first display region W1 based on the display control program.

Figure 8:
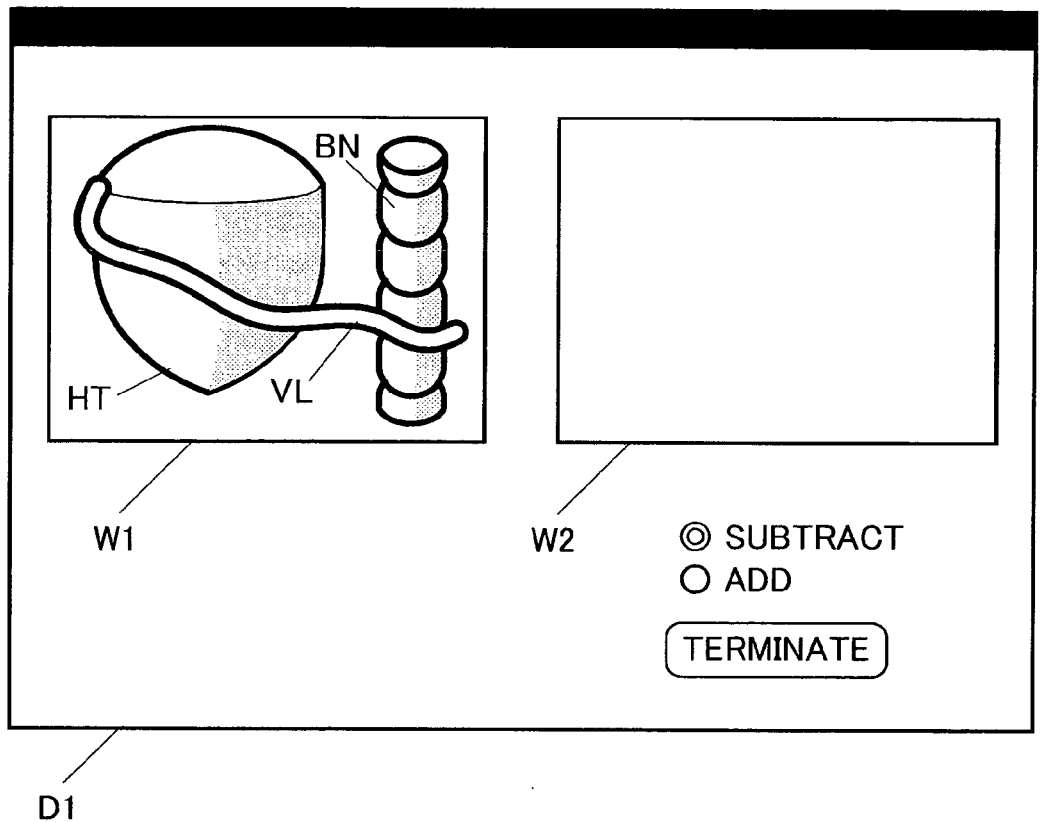
FIG. 8 is a diagram showing a display example of an "initial image" which is displayed by the "medical image generating process" shown in FIG. 6.

FIG. 8 is a diagram exemplarily showing an example of an initial image to be displayed. As illustrated in the diagram, a heart image HT, a vessel image VL around the heart and a bone image BN are displayed as an initial image in the display region W1 of the display screen D1. In the embodiment, of the individual parts shown by the initial image, the "heart" and the "vessels around the heart" together are treated as an "ROI".

As shown in FIG. 7, operation type buttons OB and a termination button TB are displayed on the display screen D1. The operation type buttons OB are used to select an operation type. The termination button TB is used to instruct the termination of the extraction of an ROI. In the embodiment, "subtract" and "add" are set as operation types. "Radio buttons" or so, for example, are laid out as the operation type buttons OB to select one of the operation types.

In the embodiment, "subtract" is an operation to eliminate a part of the image displayed in the first display region W1. "Addition" is an operation to add a part of the image displayed in the second display region W2 to the image displayed in the first display region W1. That is, with the "initial image" displayed, there is no image displayed in the second display region W2, so that "subtract" is selected.

As the initial image is displayed in the first display region W1, the control unit 310 controls the input control unit 330 to accept the selection of the operation type buttons OB. The control unit 310 also accepts the input of an arbitrary point in the first display region W1 (step S203). That is, a pointer like a cursor is displayed on the display screen D1 in accordance with the operation of the input device 33 which is, for example, a pointing device (mouse or so). The control unit 310 accepts the selection of the operation type buttons OB or an input, such as clicking, in the first display region W1 or the second display region W2. In other words, one of the operation types is selected by the operation of the operator and a desired ROI is designated on the initial image displayed in the first display region W1. In the embodiment, the heart and the vessels around the heart are taken as an ROI. Therefore, the operator selects, for example, "subtract" as the operation type. Then, the operator points the pointer at the portion of the bone image BN as a region of no interest on the initial image displayed in the first display region W1 and clicks it to designate the part to be removed.

When an input is made by such an operation, the control unit 310 accesses the operation history DB 361 of the storage unit 360. Then, the control unit 310 creates a new record with the "operation number" being the initial value (e.g., "001") (step S204).

Next, the control unit 310 specifies the operation type input, the display region which is the target of the operation, and the three-dimensional coordinates of the input point (hereinafter called "input information") (step S205). The operation type is specified by discriminating whether the operation is "subtract" or "add" based on which button in the operation type buttons OB is selected. The display region is specified by discriminating whether designation is done in which display region, based on the two-dimensional coordinates of the input point on the display screen D1.

Figure 9:
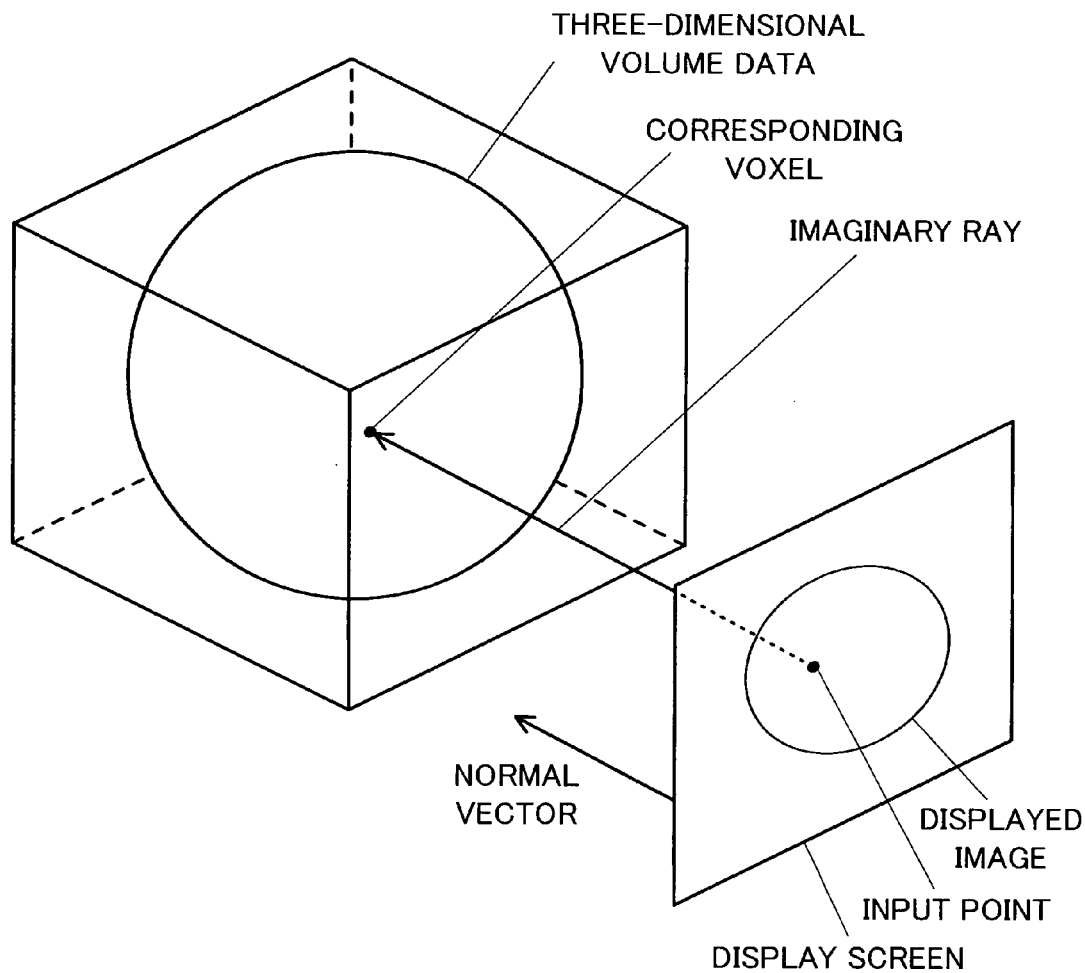
FIG. 9 is an exemplary diagram for explaining the principle of a process to "specify input information" in the "medical image generating process" shown in FIG. 6.

The "three-dimensional coordinates of an input point" are acquired by specifying a voxel (three-dimensional coordinates) on the corresponding three-dimensional volume data based on the position (two-dimensional coordinates) indicating the input point on the display screen D1. Here, a voxel is specified by irradiating an imaginary beam (imaginary ray) in the vector direction normal to three-dimensional volume data from the input point on the display screen D1. In other words, a three-dimensional two-dimensional image is displayed by the ray casting scheme using three-dimensional volume data in the embodiment. As the imaginary ray is computed, therefore, an image is displayed (orthogonal projection display) as if a part of three-dimensional volume data were projected on the display screen D1, as shown the conceptual diagram in FIG. 9. Therefore, first, the imaginary ray in the vector direction normal to three-dimensional volume data is computed from the input point on the display screen D1 (more specifically, the first display region W1 or the second display region W2). Then, the three-dimensional coordinates of the input point are obtained by acquiring a voxel at which the imaginary ray has achieved on the three-dimensional volume data.

As the input information is specified, the control unit 310 records the specified at step S205 (i.e., information on the coordinates and the operation type) in a record in the operation history DB 361 created at step S204 (step S206). In this example, the three-dimensional coordinates (X1, Y1, Z1) of the specified voxel are recorded in the item "input point". As the initial screen is displayed in the first display region W1 in the example, the coordinates are recorded in the field corresponding to "W1". Further, "subtract" is recorded in the item "operation".

After recording the specified input information in the operation history DB 361, the control unit 310 executes the "region extracting process" to extract a region corresponding to the input point (step S300). This "region extracting process" will be described referring to a flowchart illustrated in FIG. 10. For easier explanation, symbols defined as follows are used.

WX: display region where an input has been made
WY: the other display region to WX
PZ: input point on the display screen and its three-dimensional coordinates
VX: three-dimensional volume data belonging to WX
VY: three-dimensional volume data belonging to WY
PZI: set of input points
SV: volume data of a continuous region where "1" for identifying the first display region W1 or "2" for identifying the second display region W2 is set in "X" and "Y". If the first display region W1 is the display region where an input has been made, "X=1, Y=2", whereas if the second display region W2 is the display region where an input has been made, "X=2, Y=1". "Z" indicates the number of inputs (the number of operations).

The control unit 310 specifies a continuous region SV containing an input point PZ from the volume data VX belonging to the display region WX where the input has been made (step S301). In this example, the continuous region SV is specified by a scheme, such as "flood fill".

The control unit 310 determines whether or not the obtained continuous region SV contains the past input point set PZI (step S302). The input point set PZI is obtained by referring to the three-dimensional coordinates recorded both in "W1" and "W2" of the item "input point" in the operation history DB 361. That is, the input point set PZI is a set of input points designated by operations previous to the current operation (old input points).

When the continuous region SV contains the past input point set PZI (YES at step S302), the control unit 310 executes the "region segmentation process" to specifically distinguish the target region (step S400). The detailed description of the region segmentation process will be given later.

When the continuous region SV does not contain the past input point set PZI (NO at step S302), on the other hand, the control unit 310 subtracts the continuous region SV obtained at step S301 from the three-dimensional volume data VX belonging to the display region WX (step S303). Then, the control unit 310 displays an image based on the three-dimensional volume data VX after subtraction in the display region WX (step S304).

The control unit 310 then adds the continuous region SV obtained at step S301 to the three-dimensional volume data VY belonging to the other display region WY (step S305). Then, the control unit 310 displays an image based on the three-dimensional volume data VY after addition in the display region WY (step S306).

The control unit 310 accesses the operation history DB 361 of the storage unit 360 and records the coordinates specified at step S205 in the field corresponding to the display region WY of the item "input point". The control unit 310 also records "add" in the item "operation" (step S307).

Figure 11:
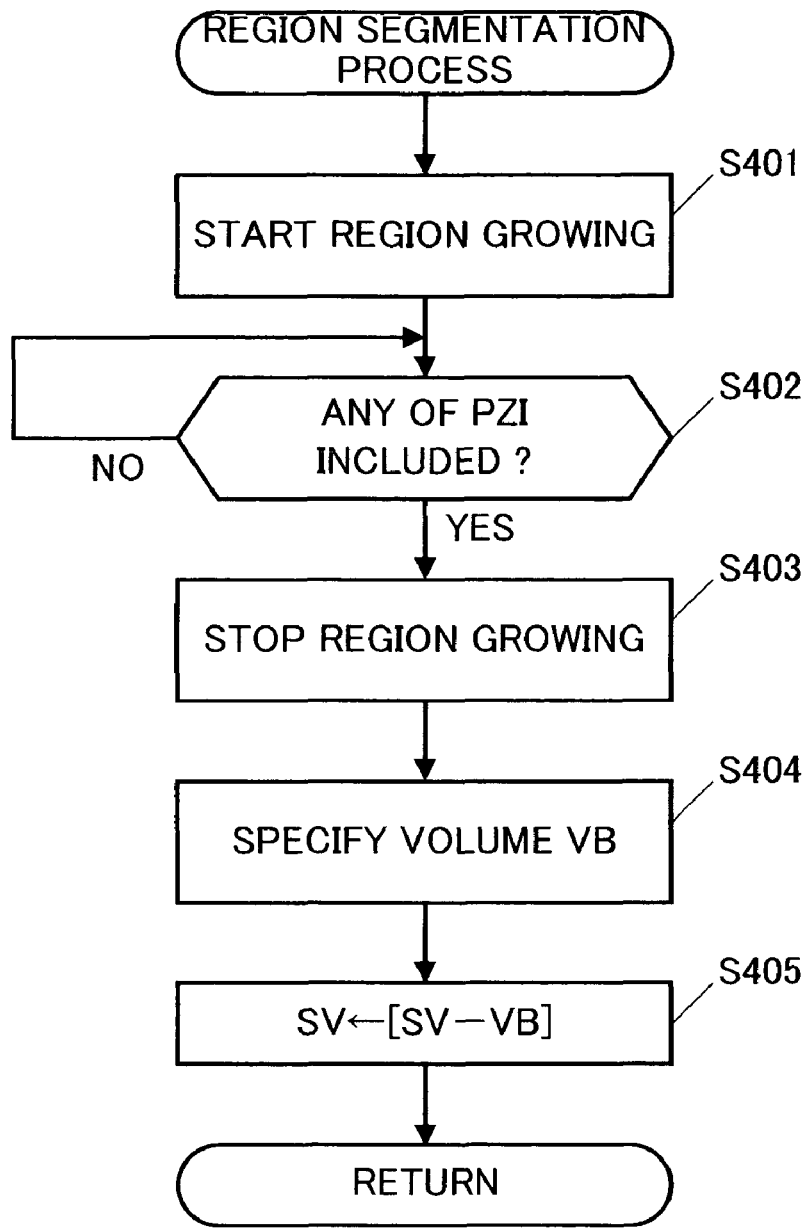
FIG. 11 is a flowchart illustrating a "region segmentation process" which is executed in the "region extracting process" shown in FIG. 10.

The "region segmentation process" which is performed when it is determined at step S302 that "the obtained continuous region SV contains the input point set PZI" will be described referring to a flowchart illustrated in FIG. 11.

The control unit 310 performs region growing in the continuous region SV obtained at step S301 with the input point PZ specified at step S206 as the starting point (step S401).

The control unit 310 determines whether any input point in the input point set PZI is included in the range of the region growing executed at step S401 or not (step S402). When the control unit 310 determines that any input point in the input point set PZI lies in the range of the region growing (YES at step S402), the control unit 310 stops the region growing (step S403). In this example, the volume of the range when region growing is stopped, i.e., the volume of the range which contains some of the input points in the input point set PZI is treated as "volume VA".

The control unit 310 specifies the volume of the range that does not contain any input point in the input point set PZI (hereinafter referred to as "volume VB") based on the range of the region growing that has been stopped at step S403 (step S404).

In this example, the volume VB is specified based on, for example, the volume value of the range resulting from the region growing. That is, the control unit 310 computes a volume value VA-size of the volume VA, then executes region growing in the continuous region SV with the input point PZ as the starting point again. The control unit 310 obtains a volume value VB-size for the range of region growing when needed, and stops region growing when the ratio of the volume value VB-size to the volume value VA-size computed previously becomes a predetermined ratio (e.g., 1/2). Then, the control unit 310 treats the volume of the range when region growing is stopped as "volume VB".

Figure 10:
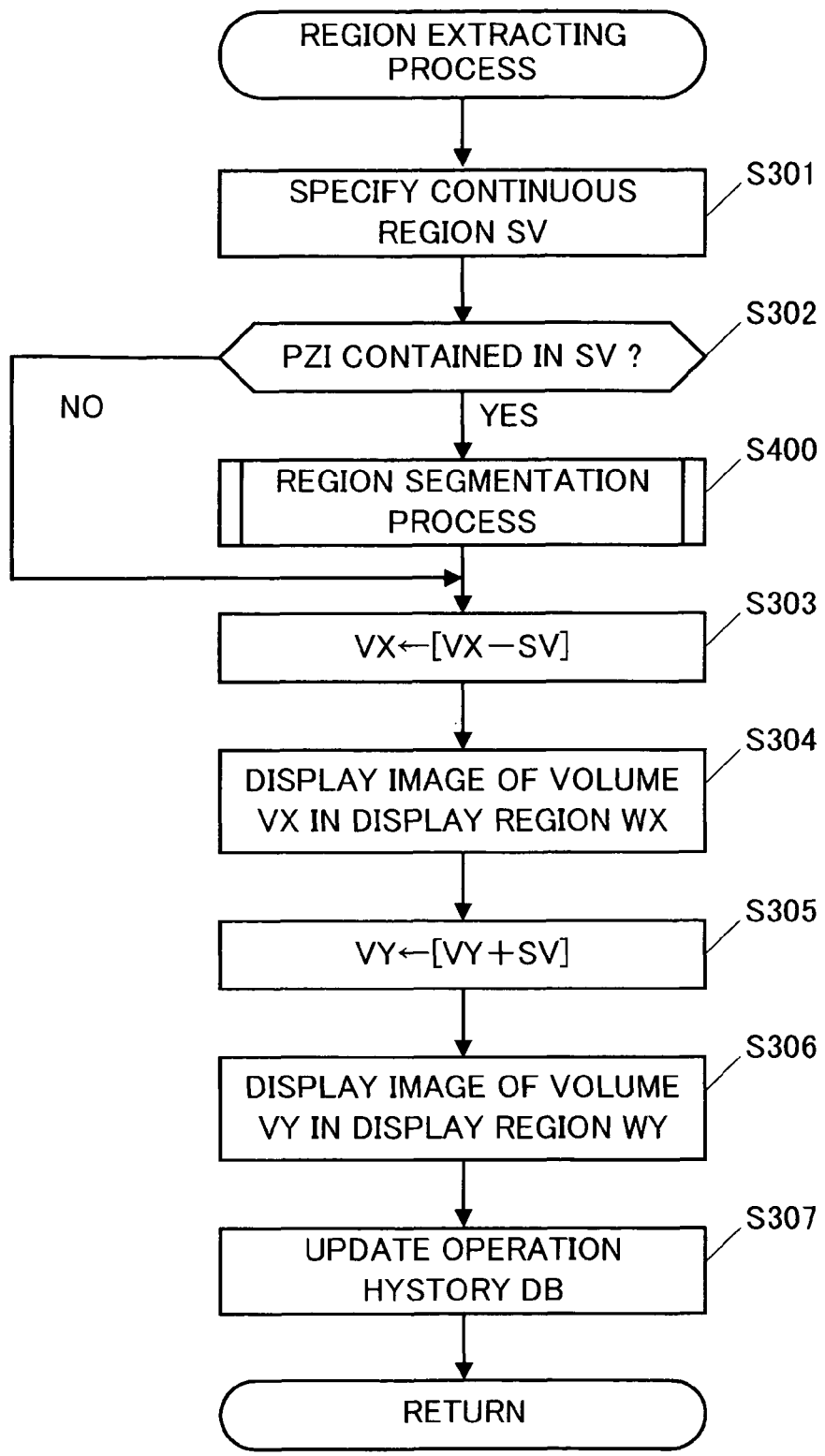
FIG. 10 is a flowchart illustrating a "region extracting process" which is executed in the "medical image generating process" shown in FIG. 6.

The control unit 310 subtracts the volume VB from the volume of the continuous region SV (step S405), and goes to step S303 in the "region extracting process" shown in FIG. 10. That is, the control unit 310 subtracts the volume of the continuous region SV after subtraction of the volume VB from the volume data VX belonging to the display region WX. Then, the control unit 310 adds the volume of the continuous region SV to the volume data VY belonging to the display region WY The control unit 310 performs recording (update) in the operation history DB 361 at step S307 in the "region extracting process", then returns to the "medical image generating process" shown in FIG. 6. The control unit 310 determines whether or not there is an instruction of termination originated from the selection of the termination button TB by the operator (step S207). The control unit 310 repeats the individual processes at and following step S203 until the termination instruction is issued (NO at step S207).

When the termination instruction is input (YES at step S207), however, the control unit 310 terminates this process.

The operational concept of the processes discussed above will be described below referring to the accompanying drawings showing display examples and the conceptual diagrams.

Figure 12:
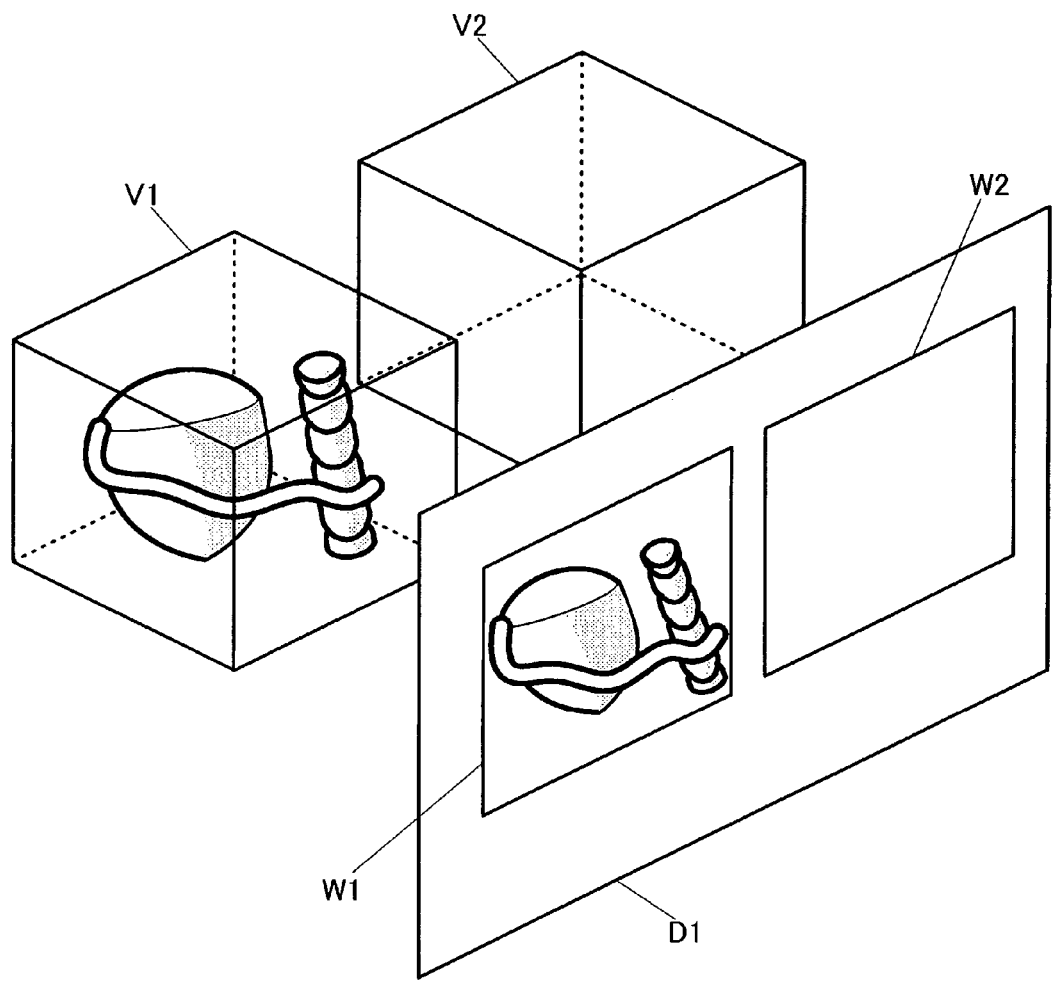
FIG. 12 is an exemplary diagram for explaining the conceptual relationship between a display screen and volume data according to the embodiment.

The following describes an operation of extracting an ROI into the display region W1 from the display state of the "initial image" as shown in FIG. 8. FIG. 12 shows the relationship between three-dimensional volume data and the display screen with the initial image displayed. According to the embodiment, as described above, an image is displayed by volume rendering using ray casting. Accordingly, three-dimensional volume data is developed in a predetermined memory area. Then, an arithmetic operation is performed as if the developed three-dimensional volume data were projected on the display screen.

As shown in FIG. 12, memory areas respectively corresponding to the display regions W1 and W2 defined on the display screen D1 are prepared in the embodiment. Then, three-dimensional volume data is developed in each memory area. Hereinafter, three-dimensional volume data corresponding to the display region W1 is called "volume V1", and three-dimensional volume data corresponding to the display region W2 is called "volume V2". While three-dimensional volume data is developed for each display region, the coordinate system is common to both the volume V1 and volume V2. The following description is given of a case where an "ROI" is the heart image HT and vessel image VL and is selected and extracted.

Figure 13A:
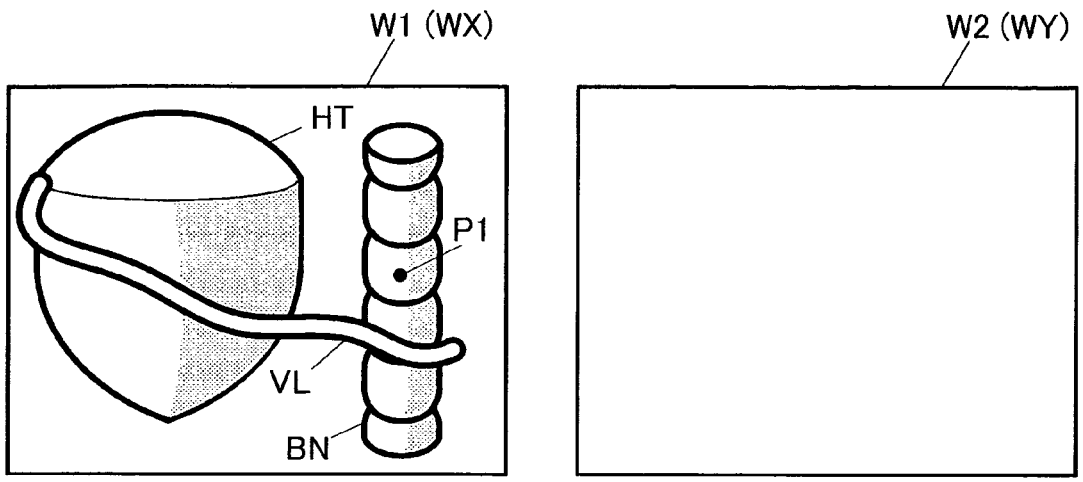
FIG. 13A is a diagram showing an example of display results and illustrating a display region W1 and a display region W2 with an initial image displayed in the display region W1 and an input point P1 designated on the initial image.

FIG. 13A shows the display regions W1 and W2 with the initial image displayed. That is, FIG. 13A shows the state in step S202 in the "medical image generating process" (FIG. 6). Now, the bone image BN which is a region of no interest is subtracted from the heart image HT, the vessel image VL and the bone image BN. That is, an image indicating an ROI is left in the display region W1 and an image indicating a region of no interest is displayed in the display region W2. Specifically, first, "subtract" in the operation type buttons OB on the display screen D1 is selected (see FIG. 7). Then, the pointer is pointed and clicked on the bone image BN which is a region of no interest to designate a target to be subtracted (step S204). The input point here is "input point P1". As there is an input on the display region W1, the symbol WX indicating the display region where "an input has been made" shows W1, the symbol WY indicating the other display region shows W2.

When the input point P1 is designated on the image, a corresponding voxel (three-dimensional coordinates) on three-dimensional volume data is specified and recorded in the operation history DB 361. As it is the initial operation, a record with the operation number of "001" is created and the specified three-dimensional coordinates are recorded in the field corresponding to "W1" in the item "input point". Based on the selection of the operation type buttons OB, it is determined that the "operation" is "subtract" and "subtract" is recorded in the item "operation" (steps S204 to S206).

Next, the "region extracting process" (FIG. 10) based on the three-dimensional coordinates of the input point P1 is executed. That is, the continuous region SV containing the input point P1 is specified (step S301). As the arbitrary point P1 is the first input here, there is no input point set PZI (NO at step S302). Therefore, an image obtained by subtracting the specified continuous region SV from the initial image is displayed in the display region W1 (steps S303 and S304). The continuous region SV is displayed in the display region W2 (steps S305 and S306).

Figure 13B:
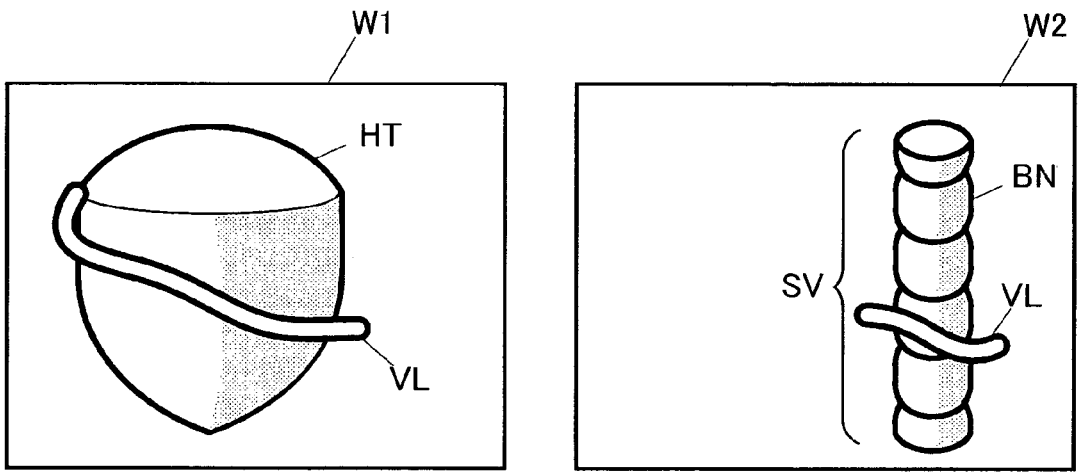
FIG. 13B is a diagram showing an example of display results illustrating the display regions W1 and W2 after a subtraction process.

As the input point P1 is designated on the bone image BN which is a region of no interest, it is expected that the continuous region SV to be obtained shows only the bone image BN. In case where a part of the vessel image VL is in contact with the bone image BN, for example, the part of the vessel image VL may be included in the continuous region SV. A display example in such a state is illustrated in FIG. 13B.

As illustrated, an image showing a part of the vessel image VL is displayed together with an image showing the bone image BN in the display region W2. As the vessel image VL is an ROI, an operation of displaying the image of the vessel image VL, displayed in the display region W2, in the display region W1. That is, the operator points the pointer on the image showing a part of the bone image BN displayed in the display region W2 and clicks it (point P2 in the diagram). As an input is made in the display region W2, WX in the individual processes becomes W2, and WY becomes W1. As it is the operation of adding the image in the display region W2 to the image in the display region W1, "add" in the operation type buttons OB is selected.

When such an input is made, the three-dimensional coordinates of the input point and the operation type are recorded in the operation history DB 361 as per the above-described case. Because this is the second operation, a record with the operation number of "002" is created. As the input is made in the display region W2, three-dimensional coordinates are recorded in the field corresponding to "W2" in the item "input point" in that record. Further, "add" is recorded in the item "operation".

Figure 13C:
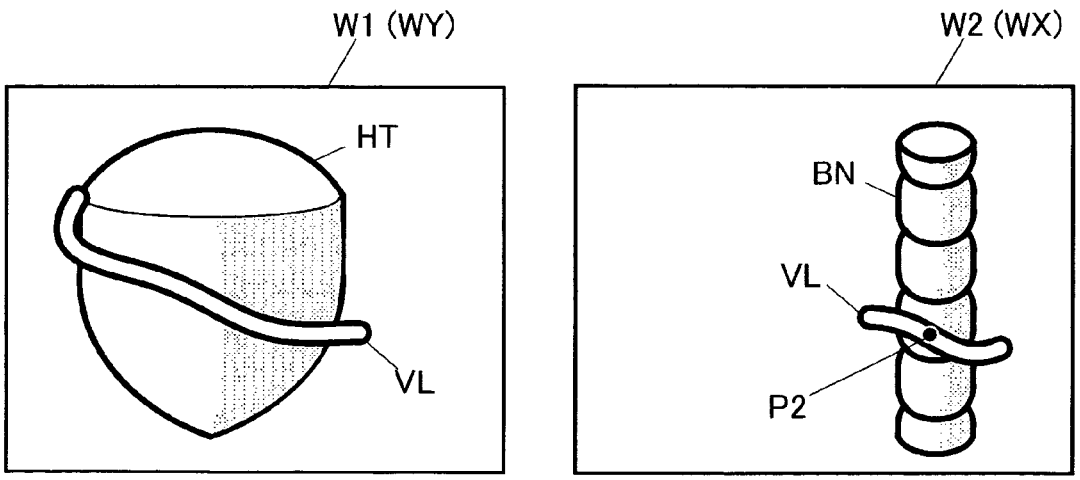
FIG. 13C is a diagram showing an example of display results illustrating the display regions W1 and W2 with an input point P2 designated on the image displayed in display region W2.

Next, the continuous region SV containing the input point P2 is computed, but there is the input point set PZI for the current input is not the first input. Therefore, the continuous region SV to be computed is classified into the region which contains the input point set PZI and the region which does not. Because the point P1 is designated on the bone image BN in the previous operation in the example in FIG. 13, it is determined whether or not the continuous region SV contains the input point P1. Specifically, if the continuous region SV computed based on the input point P2 shows only the vessel image VL displayed in the display region W2, the continuous region SV does not contain the input point P1. Depending on the precision of the computation of the continuous region or the degree of contact between the vessel image VL and the bone image BN, a part of the bone image BN may be included in the continuous region SV which is computed based on the input point P2. The further description of the embodiment is given of the latter case as an example.

That is, when the range of the continuous region SV computed based on the input point P2 covers not only the volume VB in the display region W2 but also a part of the bone image BN, it is likely that the input point P1 is included in the continuous region SV. In this case, the "region segmentation process" (FIG. 11) is executed. Here, the volume VA is obtained by performing region growing until the input point P1 is included in the continuous region SV (steps S401 to S403). Then, the volume VB of the range which does not contain the input point P1 is specified based on the obtained volume VA (step S404).

The input point P1 is designated on the bone image BN, and the input point P2 on the vessel image VL. From this fact, to specify the range that shows only the vessel image VL, the volume VB of the range which does not contain the input point P1 is obtained based on the obtained volume VA obtained by region growing with the input point P2 as the starting point.

Figure 14A:
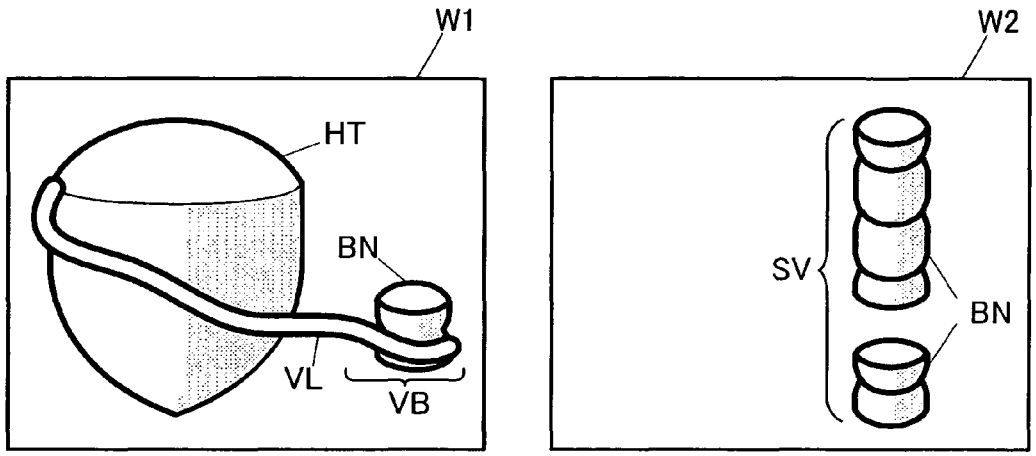
FIG. 14A is a diagram showing an example of display results illustrating the display regions W1 and W2 after an addition process.
Figure 14B:
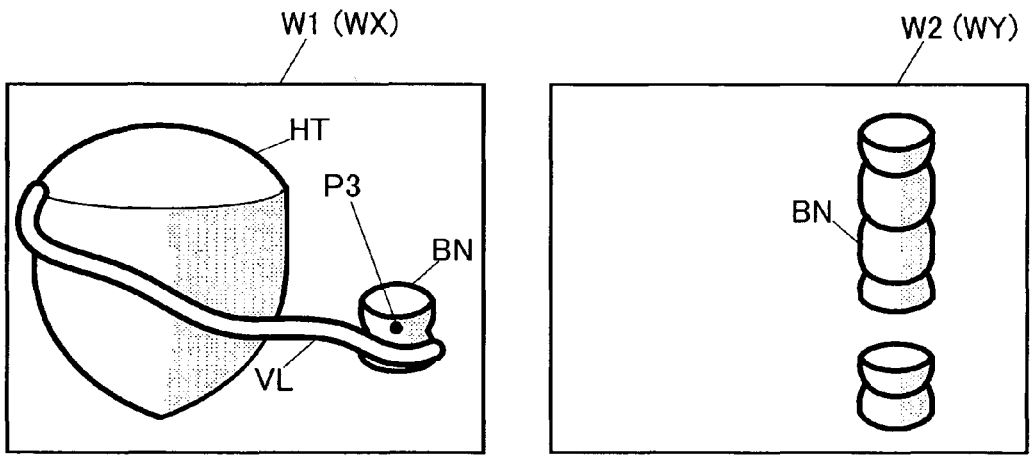
FIG. 14B is a diagram showing an example of display results illustrating the display regions W1 and W2 with an input point P3 designated on the image displayed in display region W1.

When the volume VB is specified, the image corresponding to the volume VB is added and displayed in the display region W1 as shown in FIG. 14A. The image corresponding to the volume VB is subtracted from the image corresponding to the continuous region SV in the display region W2.

As shown in FIG. 14A, the vessel image VL which is an ROI is displayed in the display region W1. Depending on, for example, the precision of the computation of the continuous region or the degree of contact between the vessel image VL and the bone image BN, however, the vessel image VL may still be accompanied with a part of the bone image BN. In this respect, an operation of subtracting the bone image BN displayed in the display region W1 is carried out.

The operator selects "subtract" in the operation type buttons OB and points the pointer on the bone image BN displayed in the display region W1 to thereby designate an input point P3. As this is the third operation, a record with the operation number of "003" is created in the operation history DB 361. As the input is made in the display region W1, the three-dimensional coordinates of the input point P3 are recorded in the field corresponding to "W1" in the item "input point" in that record. Further, "subtract" is recorded in the item "operation".

Figure 14C:
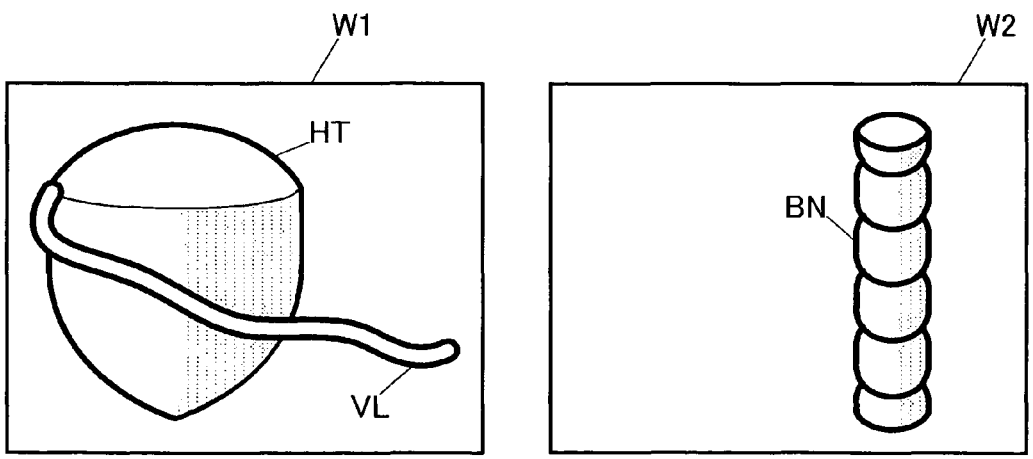
FIG. 14C is a diagram showing an example of display results illustrating the display regions W1 and W2 after another subtraction process.

The continuous region SV, and the volume VB when needed, are specified based on the designated input point P3. As shown in FIG. 14C, only the bone image BN displayed in the display region W1 is subtracted from the display region W1, and added and displayed in the display region W2. As a result, only the heart image HT and the vessel image VL which are an ROI are displayed in the display region W1, and only the bone image BN which is a region of no interest is displayed in the display region W2. That is, an ROI is extracted in the display region W1.

As described above, two display regions W1 and W2 are provided on the display screen D1 and a region designated in one of the display regions is removed from that display region and is displayed in the other display region. Accordingly, an operator can extract an ROI through a continuous operation while simultaneously viewing images displayed in the two display regions. Unlike the conventional ROI extracting work, therefore, the embodiment eliminates the need to go back to one previous operation and start region designation again when a region is designated inadequately. In other words, the work load and the work time of an operator needed at the time of extracting an ROI can be reduced significantly. Further, images displayed in both the display regions W1 and W2 are drawn based on three-dimensional volume data which has a common coordinate system. It is therefore possible to display images in both display regions interlockingly while changing the display direction, the degree of opaqueness and color information or so as needed. Even when a complicated region is to be designated, therefore, an input point can be designated easily.

Although an ROI is extracted in three operations in the embodiment for the sake of easier description, designation of a larger number of input points is actually required. Therefore, multiple records are recorded in the operation history DB 361 and there is an input point set containing multiple input points. In such a case, the volume VB is specified in the "region segmentation process" so as to be a range which contains none of input points in the input point set. The greater the input point set is, therefore, the higher the extraction precision becomes. That is, under the circumstance where a target region has a complicated shape, requiring designation of multiple input points, as the work progresses (i.e., in the stage of designating the region of a finer part), the extraction precision becomes relatively higher, resulting in reduction in the work load and work time in the work of extracting an ROI.

Although there are two display regions provided on the display screen D1 in the embodiment, the number of the display regions is not restrictive and may take any value as long as it is equal to or greater than two. For example, a third display region W3 may be laid out on the display screen D1 in addition to the display regions W1 and W2 and an image which is the combination of the volume of an ROI extracted in the display region W1 and another volume may be displayed in the display region W3. That is, the display regions W1 and W2 are used in the ROI extracting work and the display region W3 is used to display an image obtained as a result of the extraction.

This makes it possible to set the medical image of the same patient, acquired in the past, semitransparent and synthesize the image for comparison with a current image, synthesize a medical image acquired by another modality (e.g., an image which mainly shows a tumor) with the volume data of a diagnosis target and display the synthesized image, or synthesize an image generated in advance (e.g., an image showing only bones or only vessels) with the volume data of a diagnosis target and display the synthesized image. In other words, the progress of the physical condition of the same examinee can be observed or a normal portion can be compared with an abnormal portion, thus contributing to more effective image diagnosis. Even in such a case, the invention may be employed to carry out such display control as to remove a region designated in the display region W3 display from the display region W3 and then display the region in the display region W2.

Although the display regions W1 and W2 are defined side by side on the display screen D1 in the embodiment, they may be defined as overlapping each other to be substantially a single display region. In this case, an image to be displayed in the display region W1 and an image to be displayed in the display region W2 are displayed in such a way as to overlie each other. At this time, an image showing a designated region and an image obtained by removing the designated region from a target image can be displayed distinguishably even if those images are displayed overlying each other in the same display region by displaying one of the images in a different display mode in which predetermined display parameters, such as the degree of transparency, the degree of brightness and the color value, are changed.

An ROI is extracted into the display region W1 in the embodiment. However, whether a region is an ROI or not is a matter of choice which can be made by an operator arbitrarily. Therefore, it is also an arbitrary matter to display an ROI in which one of the display regions. That is, "regions of no interest" are removed from the initial image in the display region W1 one after another in the embodiment, thereby leaving only the image of an ROI in the display region W1. If "ROIs" are removed from the initial image in the display region W1 one after another instead, however, only the ROI image alone is displayed in the display region W2.

In the embodiment, "subtract" and "add" are designated distinguishably by the operation of the operation type buttons OB. However, if an operation is decided specifically according to the display region where an input is made, like "designation in the display region W1 is subtraction" and "designation in the display region W2 is addition", the display of the operation type buttons OB or an input to designate the operation type may be omitted. In this case, the operation type may be automatically decided by discriminating in which display region the input point has been designated, and may be recorded in the operation history DB 361.

In the embodiment, a memory area where volume data is to be developed is provided for each display region defined and the image of an ROI is displayed in one of the display regions by performing addition/elimination of a volume among the individual memory areas. However, how volume data is used in processing an image is an arbitrary matter. For example, every time an input point is designated, the volume data of a continuous region to be specified may be developed in the memory area. In case where a new input point, when designated, lies in a continuous region belonging to an old input point, a new continuous region is specified by segmenting the former continuous region.

Although a new continuous region is specified by using a continuous region which has already been specified in the embodiment, the method of specifying a continuous region is not restrictive. In this case, for example, a continuous region which contains all the input points belonging to one of the display regions but no input points belonging to the other display region is specified from the volume data of the initial image.

In the "region segmentation process" according to the embodiment, region segmentation is carried out by performing region growing from one of input points. The region segmentation is not restrictive but may be executed by using plural input points. For example, a continuous region may be segmented by a line passing between two designated points or a continuous region may be specified in such a way as to contain all of designated input points. Alternatively, a continuous region may be specified by segmenting a plane which contains a curve including an input point set or a curve created by using an input point set (e.g., a Bezier curve, a spline curve or a regression curve).

Although an ROI is designated as an operator inputs an arbitrary point in the embodiment, designation of an ROI is in no way limited to this particular method. For example, an input history up to a current time may be stored and an input point indicated in the input history information may be designated. Alternatively, an arbitrary point may be designated automatically through an arithmetic operation done by the control unit 310.

In the embodiment, volume data which constitutes a target image is displayed on the screen in such a way as to be orthogonally projected on the screen. The image display scheme is not restrictive but any other scheme available can be employed. For instance, the invention may be applied to a case where an image is displayed in perspective display which is used in a virtual endoscopy or so.

In the embodiment, the functions needed from the acquisition of volume data to generation and processing of a medical image are achieved as separate units, such as the modality 100 that performs an image taking operation, the control terminal 200 that controls the modality 100 and the image processing apparatus 300 that generates and processes a medical image. It is optional to decide which units should be used to achieve all of the functions or some of the functions. For example, the modality 100 and the control terminal 200 may singularly operate or cooperate to execute the "medical image generating process", the "region extracting process", the "region segmentation process", etc. In this case, the modality 100 and/or the control terminal 200 should have a structure which embrace the structure of the image processing apparatus 300.

The image processing apparatus 300 according to the embodiment can be comprised of a general-purpose computer system, such as a personal computer, as well as an exclusive apparatus. In this case, the image processing apparatus 300 can be constructed by installing a part of the program to achieve the individual processes or the entire program in a general-purpose computer system and running it under the control of an OS. The form of distribution of the program in this case is not restrictive. For example, the program may be stored in a recording medium such as CD-ROM and distributed in that form, or may be multiplexed on a carrier wave to be distributed over a communication medium (Internet or so).

In short, the invention can reduce the work load and the work time needed at the time of extracting an ROI from a medical image and can improve the working efficiency of extracting an ROI at the time of generating and processing a medical image. The invention can also provide a more effective image diagnosis scheme.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2003-428935 filed on Dec. 25, 2003 and including specification, claims, drawings and summary. The disclosure of the above Japanese Patent Application is incorporated herein by reference in its entirety.

What is claimed is:

1. A medical image processing apparatus which shows an image of an extracted region of interest of three-dimensional volume data representing an inside of a living body, said apparatus comprising:
    a display unit which has a first display area and a second display area, and displays said medical image in at least one of said display areas;
    a subtraction point specifying unit which accepts designation of a point on said first display area as a subtraction input point and specifies subtraction coordinates indicating a position in said three-dimensional volume data corresponding to said subtraction input point;
    a first region specifying unit which specifies a first closed continuous region including said subtraction coordinates;
    a first display control unit which generates an image from said three-dimensional volume data indicating a region after subtracting said first closed continuous region from said three-dimensional volume data on said first display area and generates an image from said three-dimensional volume data, indicating said first closed continuous region on said second display area;
    an addition point specifying unit which accepts designation of an addition point on said second display area and specifies addition coordinates indicating a position in said three-dimensional volume data corresponding to said addition input point;
    a second region specifying unit which specifies a second closed continuous region which does not include said subtraction coordinates while including the addition coordinates; and
    a second display control unit which generates an image from said three-dimensional volume data indicating a third region after subtracting said second closed continuous region from said first closed continuous region for display on said second display area and generates an image from said three-dimensional volume data indicating the region of interest after subtracting said third region from said three-dimensional volume data on said first display area.

2. The medical image processing apparatus according to claim 1 further comprising
    a recording unit which records history data representing input histories of the input points specified by said subtraction point specifying unit and said addition point specifying unit, wherein
    said first and second region specifying units specify said regions based on said history data.

3. The medical image processing apparatus according to claim 1, wherein said subtraction input point is designated on the image displayed on said first display area; and
    said addition input point is designated on the image displayed on said second display area.

4. The medical image processing apparatus according to claim 1, wherein said first and second display areas do not overlap one another on said display unit.

5. The medical image processing apparatus according to claim 1, wherein
said first and second display areas overlap one another on said display unit thus substantially constituting a single display area, and
said first and second display control units superimpose the images to be displayed on said first and second display areas while differentiating display mode for each of said images.

6. A method of showing an image of an extracted region of interest of three-dimensional volume data representing an inside of a living body using a computer having at least one display and programmed to perform the steps of said method, said method comprising the steps of:
displaying a target medical image to be processed on a first display area of said at least one display;
accepting designation of a subtraction input point on said first display area which specifies coordinates indicating a position in said three-dimensional volume data;
specifying a first closed continuous region including said subtraction coordinates in response to said step of accepting designation of a subtraction input point;
displaying an image on said first display area showing said medical image after subtracting said first closed continuous region;
displaying an image on a second display area of said at least one display showing said first closed continuous region;
accepting designation of an addition input point on said medical image which specifies addition coordinates representing a position in said three-dimensional volume data; specifying a second closed continuous region which does not include said subtraction coordinates while including the addition coordinates;
displaying an image on said second display area indicating a third region comprised of said first continuous region after subtracting said second closed continuous region;
displaying an image on said first display area, indicating the region of interest after subtracting said third region from said medical image.

7. The method according to claim 6, wherein said step of accepting designation of a subtraction input point is further defined as specifying a subtraction input point designated on the image displayed on said first display area and said step of accepting designation of an addition input point is further defined as specifying an addition input point designated on the image displayed on said second display area.

8. The method according to claim 6, further comprising displaying each of the images on said first and second display area on a same display area while differentiating display mode for each of said images.

9. The method according to claim 6 further comprising recording history data representing input histories of the input points, wherein
said steps of specifying the first closed continuous region and specifying the second closed continuous region are further defined as specifying said regions based on said history data.

10. A computer-readable recording medium in the form of a hard disk device, a read-only memory (ROM), a random access memory (RAM), a semiconductor storage device, or a CD-ROM storing a program which allows a computer to function as a medical image processing apparatus comprising:
a display area defining unit which defines at least a first display area and a second display area;
a target-image display unit which displays a medical image on said first display area based on three-dimensional volume data indicating an inside of a living body;
a subtraction point specifying unit which accepts subtraction input point designated on said first display area and specifies subtraction coordinates corresponding to a position of said subtraction input point;
a first region specifying unit which specifies a first closed continuous region including said subtraction coordinates;
a first display control unit which displays an image, generated from said three-dimensional volume data, indicating a region after subtracting said first closed continuous region from said three-dimensional volume data and displays an image, generated from said three-dimensional volume data, indicating said first closed continuous region on said second display area;
an addition point specifying unit which accepts an addition input point designated on said second display area and specifies addition coordinates corresponding to a position of said addition input point;
a second region specifying unit which specifies a second closed continuous region which does not include said subtraction coordinates while including the addition coordinates; and
a second display control unit which displays an image, generated from said three-dimensional volume data, indicating a third region showing said first continuous region after subtracting said second closed continuous region on said second display area, and displays an image, generated from said three-dimensional volume data, indicating a region after subtracting said third region from said three-dimensional volume data on said first display area.

11. The computer-readable recording medium according to claim 10, further comprising:
an input-point information recording unit which records history data representing input histories of the input points, wherein said first and second region specifying units specify said closed continuous regions based on said history data.

* * * * *